Nov. 21, 1933.   T. C. LENGNICK   1,936,514
DISCHARGE TUBE
Filed Nov. 21, 1928   2 Sheets-Sheet 1
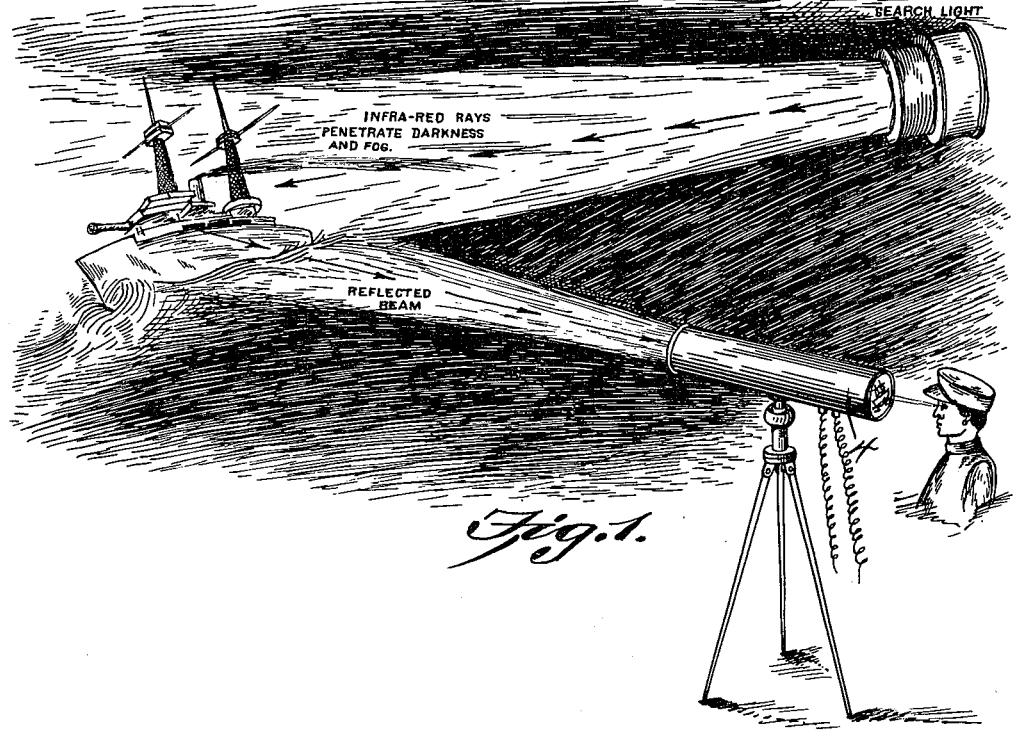
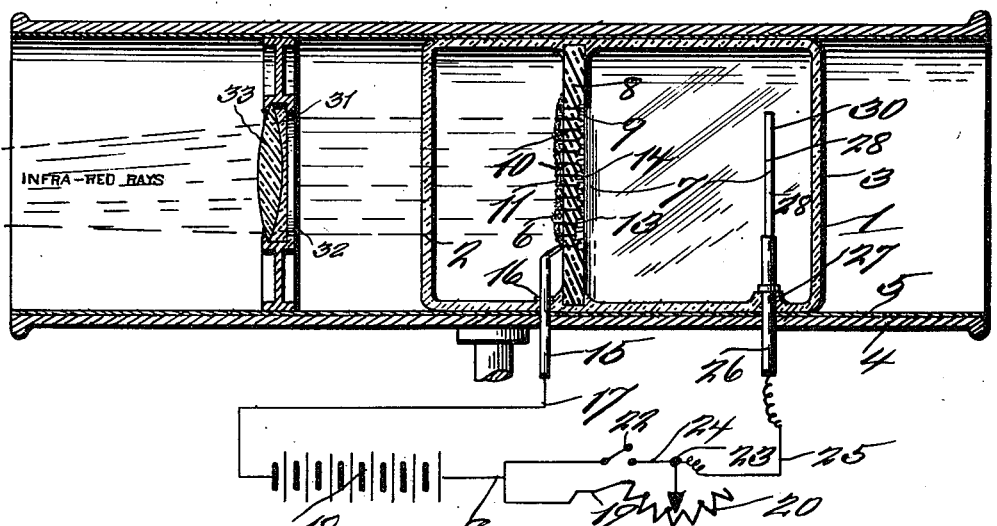
Thomas C. Lengnick INVENTOR Nov. 21, 1933.    T. C. LENGNICK    1,936,514
DISCHARGE TUBE
Filed Nov. 21, 1928    2 Sheets-Sheet 2
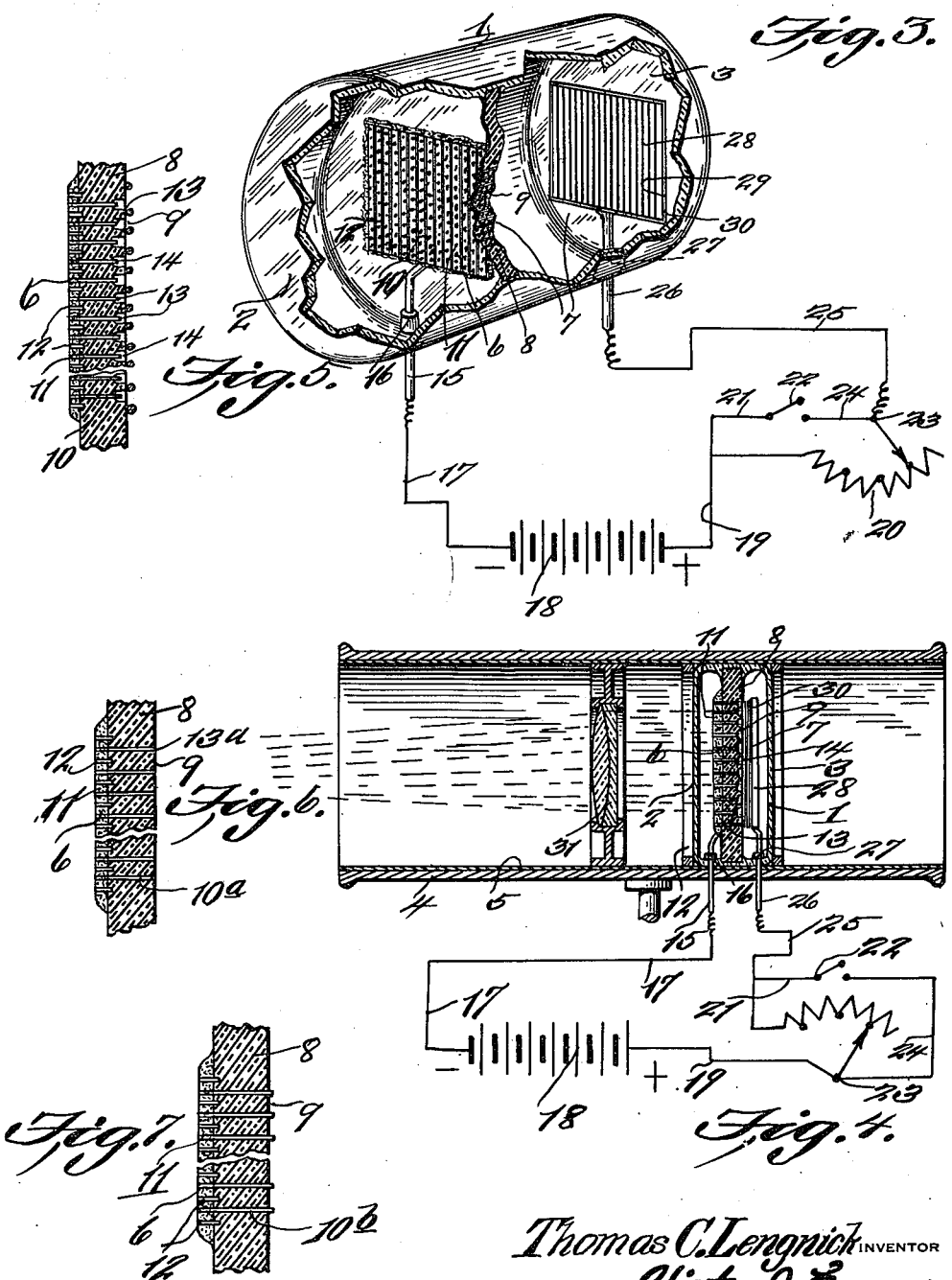

Patented Nov. 21, 1933

1,936,514

UNITED STATES PATENT OFFICE 1,936,514

DISCHARGE TUBE

Tomas C. Lengnick, Philadelphia, Pa.

Application November 21, 1928
Serial No. 320,976

1 Claim. (Cl. 250—27.5)

This invention relates to an improved device comprising a discharge tube especially adapted for use in connection with an apparatus for sighting objects through fog, clouds, and other densities, and it has been found that the light effects, and especially those of the so-called gaseous discharge in the Geissler-tubes, when operating at a voltage across the electrodes near the critical point, at which due to the lack of voltage, the ionization of the gases cease to exist, can be used with advantage.

It is, therefore, the purpose of the present invention to use these effects and the resultant action with advantage, to the extent of employing a discharge tube, creating discharges in an apparatus for sighting objects through various densities, due to the fact that comparative small changes in the voltage across the electrodes of the discharge tube produce comparatively large changes in the intensity of the light effects.

Another purpose is to provide a tube of the above referred to type adapted for use in an apparatus for sighting objects through various densities, and wherein, namely in the tube, these effects are used.

It is a further purpose to provide, in a device of this kind, a housing adapted to be focussed on an object in a density, such as a fog, clouds, or artificial smoke screens, etc., the tubular housing containing the novel tube located at any desired position within the housing, with a suitable focusing lens at any desired position in advance of the tube, whereby the infra-red rays may be transmitted through the lens and through the tube, hence in passing through the tube, falling on a light sensitive cell such as a selenium-cell, the object sighted being pictured to an observer in gaseous discharge on the cathode.

It is to be understood that the particulars herein given are in no way limitative, and that while still keeping within the scope of the invention, any desired modification of details and proportions may be made in the construction of the appliance according to circumstances.

The invention comprises further features and combination of parts to be hereinafter set forth, shown in the drawings and claimed.

In the drawings:—

Figure 1 is a view in perspective of the improved apparatus for sighting objects through various densities, such as fog, clouds, artificial smoke screens, etc., the same being constructed in accordance with the invention.

Figure 2 is a longitudinal sectional view through tube mounted in the tubular housing with the focusing lens in advance of the tube.

Figure 3 is an enlarged detailed view of the tube broken away, to show the interior construction and arrangement of the selenium cell and the gaseous discharge lamp, showing substantial space between the partition and the gaseous discharge lamp, the partition dividing the tube into two compartments, one for the selenium cell and the other for the gaseous discharge lamp.

Figure 4 is a detail sectional view through the discharge tube, showing the partition, which divides the tube into the two compartments, the gaseous discharge lamp compartment and the selenium cell compartment.

Figure 5 is an enlarged detail sectional view through the partition, more particularly defining the possible structure of the partition, though not necessarily, as it is possible to employ other means of detail construction.

Figure 6 is an enlarged detail sectional view disclosing another construction of mounting the cathode units.

Figure 7 is an enlarged detail sectional view similar to Figure 6 but showing the short wire units protruding.

Referring to the drawings, 1 identifies a tube, which may be any size in length and diameter as for example in Figures 1 and 4 and may be constructed of any suitable material, preferably glass of special make, the same being penetrable by infra-red rays, especially at one end identified by the numeral 2, and transparent at the other end 3 to the eye of an observer.

This tube may be mounted in any well-known or convenient manner and at any suitable location within a tubular housing 4, which may be of any length and any diameter found commercially suitable. Said tubular housing 4 may be made of any suitable metal, and the inner surface of this tubular housing may have a darkened surface identified at 5, so as to prevent any reflection from the inner surface of the housing into the selenium cell compartment from a lateral direction, so as to avoid any other rays than the infra-red rays entering the vacuum tube.

The tube consists essentially of two parts, a special type of selenium cell 6 and a special type of gaseous discharge lamp 7, either as in Figure 3 or as in Figure 4, and is designed to be gas tight, and dividing the tube into two compartments, namely the selenium cell and the gaseous discharge lamp compartments, is a partition 8, which may be constructed of any material found commercially suitable, such as bakelite material or asbestos, or soapstone, preferably the latter.

This partition constitutes a light-tight screen or opaque screen, and while it is light-tight it can be gas tight, or it may be both. This partition screen 8 forms an integral part of the tube. In other words when constructing the tube, the margin of the partition screen is fused or otherwise suitably connected into the wall of the vacuum tube 1, said partition screen separating the selenium cell tightly from the gaseous discharge lamp.

In some cases where only the opaque partition screen (not gas tight) is used, the selenium cell is in the same atmosphere as the parts of the gaseous discharge lamp though not necessarily. On one side of the partition screen the selenium cell structure is located adjacent the front face of the partition screen, whereas the other side forms the cathode 9.

The partition screen comprises any suitable insulating material such as bakelite, asbestos or soapstone, preferably the latter, and embedded therein is a great number or a multiplicity of small units 10 of metal, graphite or other suitable materials, (fine wire or cubes), which when being embedded in the partition screen, are all carefully insulated from each other by the insulating material and symmetrically arranged and equally spaced, and in such a manner as to present a smooth and plain surface on both the selenium cell and gaseous discharge lamp sides. In Figure 5 these short wire or cube units of metal extend transversely of the partition screen or wall with their ends on one side, adjacent the selenium cell extended a short distance beyond the surface of the insulation, the spaces between the extended ends being filled with a light sensitive material 11, in which a plurality of fine wires or strips 12 are embedded. The other ends of the fine wire units 10 terminate short of the opposite side of the wall or insulation, that is adjacent the gaseous discharge lamp side, and said terminals 13 of said units are located within the cavities 14, thereby preventing any undue electrical transmission from one to the other in transmitting the infra-red image through the partition screen, and also form the cathode of the gaseous discharge lamp.

However in Figure 6 the terminals 13a of the fine wire units 10a terminate flush with the surface of the partition screen, that is on the gaseous discharge lamp side.

The metal strips or wires 12 may be made of any suitable material preferably platinum, graphite, and in case of an opaque partition screen wall only, the fine wire units are generally of platinum or graphite, moulded in the insulating material such as bakelite or soapstone, which forms the insulating parts of the screen.

In case of gas-tight screen, the material of both the units 10 and the insulating material must naturally have about the same contraction-coefficient and the materials are generally platinum respectively and glass. In this case the selenium cell is in a separate compartment, which is generally evacuated and does not contain any of the gases of the gaseous discharge-lamp.

As previously stated on the selenium cell side of the partition screen the small wire units 10b may project sufficiently beyond the insulating material, so that the selenium cell or selenium-preparation and a fine wire screen can be conveniently located, and this fine wire screen consists of the intervening strips 12. The fine strips 12 form one electrode of the selenium cell and can be made in any desired form, the other being formed by the screen units 10b, said strips adapted to be made of any suitable material preferably platinum or graphite and specially spaced, intervening with the units 10b.

The spaces in between the electrodes are filled up with selenium-preparation or another material capable of changing its resistance when exposed to the light rays and especially infra-red rays, and at present it is the aim to use selenium or selenium preparations, due to their maximum response being in the red and infra-red section of the spectrum.

Referring to Figure 3 an electrical connection at 15 extends from the wire screen electrode 12 and is brought out through a boss 16 formed on the wall of the vacuum tube 1, though not necessarily, as this feature of construction may be made in any other suitable manner best known for commercial purposes. However, where this electrical connection 15 is brought through the wall of the tube 1, it may be fused in the boss or otherwise made solid, and a suitable conductor 17 connects with the part 15 and in turn to a battery 18, serving to conduct current to the respective electrodes. The battery is in turn connected by a wire or lead 19 to a suitable rheostat 20. A wire or lead 21 connects to a starting switch 22 and then in turn to the rheostat at 23 by a wire or lead 24, there being a wire or lead 25 united with a second connection 26, which is also fused or otherwise solidly fastened through a boss 27 of the tube 1. This connection 26 connects with the anode 28 of the gaseous discharge lamp, which as in Figure 3 may be spaced from the gasous discharge lamp cathode side of the partition screen, or positioned immediately adjavent the partition screen closely to the electrodes, as in Figures 4 and 5.

Gaseous discharge lamp operates on the sam.� principle as the neon light known in the art, in which a glow discharge is produced by a voltage impressed across to electrodes located in a gaseous atmosphere except that in the present instance the electrodes proper are each subdivided into a plurality of minute electrodes and consequently the large number of discharges are produced between the cathodes 10 or 10a or 10b and a plurality of individual anodes comprising the large anode 28. Also the voltage impressed on the electrodes 10 and 28 is set as at a value just slightly below the critical value required to produce a glow, which voltage is then increased at each minute electrode or element by the action of the selenium cell to produce a glow. The effect thus produced is a large number of individual glow discharges, each of which varies in intensity in accordance with the intensity of the infra-red ray striking the individual section of the selenium cell. Thus a pattern or image will be produced in different values of glow discharge corresponding to the image reflected by the infra-red rays. The gaseous discharge lamp anode consists of a wire screen, comprising a multitude of relatively fine wires 29, arranged in a frame 30, the frame being supported on the connection 26.

Again referring to the cathode-units of the partition screen, the short wire units 10 or 10a or 10b as in Figures 5, 6 and 7, may either project beyond or flush with the gaseous discharge lamp side of the insulating material, or somewhat below the surface of the insulating material but not covered up by the same. It is generally preferred to have the small short wire units 10 slightly below the surface of the insulating material on the gaseous discharge lamp side. This permits the anode comprising the parts 29 and 30 to be mounted directly on or adjacent the insulating material of the partition screen, making it much more easy to obtain uniform distance between the anode and cathode units.

As previously stated the anode is generally formed by a fine wire screen which is sufficiently coarse to permit the screen cathode to be viewed through it. The size of the anode corresponds generally to the effective size of the screen-cathode, but can take on any form or dimensions, and may be parallel to the cathode.

The wire connection 25 and the conductor 26 serve to conduct current to the respective electrodes. The compartment of the tube containing the gaseous discharge lamp 7 may be filled with any one or more of the so-called rare gases such as neon, helium, etc., or combinations thereof with air at suitable pressures.

The tube is connected in series with a battery or other source of electricity of sufficient potential, as diametrically shown in Figure 3, a variable resistance is also connected in series with the circuit. The starting switch is provided for momentarily applying the necessary voltage to start the gaseous discharge in the tube.

Operation

The gaseous discharge lamp is started in the usual manner by means of the starting switch and then resistance is inserted in the circuit by means of the variable rheostat, bringing the voltage across the electrodes near to critical point, at which no current can flow through the tube, due to lack of potential. (Ionization stops due to lack of potential across electrodes.) At this point the gaseous discharge is very weak and erratic and small changes in potential have noticeable effects on it. By means of a simple optical system comprising a lens 31, especially suitable for red-light and infra-red light or rays, the infra-red image of an object, normally invisible to the human eye, is cast on the selenium cell side of the screen, certain parts and spots will receive stronger light impressions than others, and consequently more current can flow from said parts of the wire screen electrode to the respective partition screen units and vice versa at these spots, due to the reduced resistance of the light affected selenium in between the electrode and the units.

Consequently these units will also show a higher negative potential on the cathode of the gaseous discharge lamp and the gaseous discharge at these spots will be of considerable more intensity than that on the unaffected units.

As these spots coincide exactly with the brightest spots of the infra-red image—those of less intensity showing correspondingly less intensity of the gaseous discharge—it will be readily understood that an exact visible image in different values of gaseous discharge of the invisible infra-red image will be obtained on the gaseous discharge cathode.

The background glow from the gaseous discharge lamp discloses an image formed by the very weak gaseous discharges which at all times cover the entire cathode. This background can still be extinguished by adding a small amount of resistance in the circuit, and so an entirely dark background can be obtained, but then both object and apparatus must remain stationary. The current can then be increased again, so bringing the gaseous discharge image to full brilliancy, which image can be observed through the coarse gaseous discharge anode.

It is to be understood that this tube will just as well respond to light visible to the human eye and also to a lesser extent to ultra-violet rays, yet the main object is to obtain images through such mediums as fog, clouds, artificial smoke screens, etc.

The lens 31 comprise a plano-convex lens section 32 and a double convex lens section 33, the two sections being fused or cemented or otherwise fastened together, one of the double convexed lens sections being received in the concavity of the section 32, and being especially suitable for infra-red light.

The invention having been set forth, what is claimed is:—

A discharge tube comprising an enclosing member having end walls penetrable by infra-red rays, an anode disposed within said enclosing member towards one end thereof, and a cathode disposed also in said member and spaced from the anode and comprising a disk of insulating material, a multiplicity of small metallic particles embedded in said disk and mounted symmetrically in a defined zone but without being in contact with each other, and a light sensitive material applied to the disk in the zone of said particles and on the side remote from the anode but in contact with said particles, an open-ended tubular member surrounding said enclosing member and extending beyond the end walls of the latter, and a compound lens in said tubular member facing that side of the enclosing member next to said cathode.

TOMAS C. LENGNICK.